US012692093B2

(12) United States Patent
Murray et al.

(10) Patent No.: US 12,692,093 B2
(45) Date of Patent: Jul. 28, 2026

(54) COMPACT CONTROL BARRIER SYSTEM

(71) Applicant: Google LLC, Mountain View, CA (US)

(72) Inventors: James Murray, Mukilteo, WA (US); Nathanael Arling Worden, Mill Creek, WA (US); Rachel Soukup, Seattle, WA (US); Samuel Gardner Garrett, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/755,078

(22) Filed: Jun. 26, 2024

(65) Prior Publication Data

US 2026/0001727 A1 Jan. 1, 2026

(51) Int. Cl.
B65G 47/22 (2006.01)
B65G 47/88 (2006.01)

(52) U.S. Cl.
CPC ......... B65G 47/22 (2013.01); B65G 47/8815 (2013.01)

(58) Field of Classification Search
CPC ........................... B65G 47/22; B65G 47/8815
USPC .............. 198/459.6, 343.1, 345.1; 193/35 A
See application file for complete search history.

(56) References Cited

U.S. PATENT DOCUMENTS

| | | | |
|---|---|---|---|
| 2,769,520 A | | 11/1956 | Davidson et al. |
| 3,154,188 A | | 10/1964 | Cross |
| 3,216,547 A | * | 11/1965 | De Good ............... B65G 47/29 |
| | | | 193/35 A |

| | | | | |
|---|---|---|---|---|
| 4,289,229 A | * | 9/1981 | Keller ................ B65G 47/8815 |
| | | | | 198/463.4 |
| 4,397,386 A | * | 8/1983 | Kampf ............... B65G 47/8815 |
| | | | | 335/262 |
| 6,230,872 B1 | | 5/2001 | Huang et al. |
| 6,763,930 B2 | * | 7/2004 | Johnson ............... B65G 47/266 |
| | | | | 198/459.7 |
| 7,559,419 B2 | * | 7/2009 | Unterhuber ........ B65G 47/8823 |
| | | | | 193/35 A |
| 9,004,259 B1 | * | 4/2015 | Corn .................. B65G 47/8815 |
| | | | | 198/530 |
| 2003/0196872 A1 | | 10/2003 | Whittle et al. |
| 2007/0017909 A1 | * | 1/2007 | Unterhuber ........ B65G 47/8815 |
| | | | | 219/121.82 |

FOREIGN PATENT DOCUMENTS

| | | | | | |
|---|---|---|---|---|---|
| EP | | 3927634 B1 | 11/2022 | | |
| JP | | 57077111 A | * 5/1982 | ........ | B65G 47/8823 |
| JP | | S6031430 A | 2/1985 | | |
| WO | WO-2007050146 A1 | * 5/2007 | | .............. | B26D 7/32 |
| WO | | 2012127867 A1 | 9/2012 | | |
| WO | | 2013144997 A1 | 10/2013 | | |
| WO | | 2023119355 A1 | 6/2023 | | |

OTHER PUBLICATIONS

Extended European Search Report for European Patent Application No. 25184438.7 dated Feb. 12, 2026. 11 pages.

* cited by examiner

*Primary Examiner* — James R Bidwell
(74) *Attorney, Agent, or Firm* — Lerner David LLP

(57) ABSTRACT

A system includes an actuator, a barrier, and a linkage system connecting the barrier to the actuator and configured to move the barrier element between a retracted position and an extended position, and a stop arranged to inhibit a motion of the linkage system in a first direction when the barrier is in the extended position.

17 Claims, 18 Drawing Sheets

140'

144

142

140"

146

148

800

COMPACT CONTROL BARRIER SYSTEM

BACKGROUND

Automated systems for handling various objects may include conveyor systems for transporting the objects from one station to another station. However, the movement of the objects may need to be controlled or temporarily stopped along the conveyor system.

BRIEF SUMMARY

According to an aspect of this disclosure, a system includes an actuator, a barrier, and a linkage system connecting the barrier to the actuator and configured to move the barrier element between a retracted position and an extended position, and a stop arranged to inhibit a motion of the linkage system in a first direction when the barrier is in the extended position.

In one example, a cam is movably coupled to the actuator. The system further includes a link having a first end and a second end. The first end of the link is rotatably coupled to the cam and the second end of the link is rotatably coupled to the barrier.

In one example, the system further includes a housing accommodating the actuator, the linkage system, the stop, and the barrier in the retracted position. The housing includes a first surface having a slot defined therewithin. The slot is defined by first and second edges parallel to one another and spaced apart by a width. The barrier has a first thickness, and the width of the slot is greater than the first thickness such that there is a first predetermined distance between the barrier and the first edge and a second predetermined distance between the barrier and the second edge when the barrier extends through the slot.

In an example, the stop is configured to inhibit a motion of the linkage system in a second direction when the barrier is in the retracted position.

In an example, the system further includes a sensor configured to detect a position of the cam. In another example, the sensor includes a first sensor configured to detect a position of the cam when the barrier is in the retracted position. In yet another example, the sensor includes a second sensor configured to detect a position of the cam when the barrier is in the extended position.

In an example, the actuator includes a brushless DC motor.

In one example, the barrier has a first height configured to extend a first predetermined distance above the top surface when the barrier is in the extended position.

According to an aspect of the disclosure, a system includes a conveyor system having at least one roller element and a barrier system removably secured adjacent to the at least one roller element. The barrier system includes an actuator, a barrier, and a linkage system connecting the barrier to the actuator and configured to move the barrier between a retracted position and an extended position. The barrier is configured to extend beyond the at least one roller element by a second predetermined distance when in the extended position.

In an example, the system further includes a stop arranged to inhibit a motion of the linkage system in a first direction when the barrier is in the extended position.

In an example, the first controller is configured to control the actuator. The first controller is compatible with a second controller of the conveyor system.

According to an aspect of the disclosure, a method for controlling a movement of an object on a conveyor system includes actuating an actuator to rotate a cam in a first direction, the cam connected to a barrier via a link. The link moves the barrier to an extended position to extend beyond a roller element of the conveyor system, thereby obstructing a movement of the object conveyed by the conveyor system.

In an example, the method further includes actuating the actuator to rotate the cam in a second direction opposite of the first direction. The link moves the barrier to a retracted position, thereby permitting a movement of the object beyond the roller element.

In an example, the method further includes resisting a further movement of the cam in the first direction, when the barrier is in the extended position and an external force is applied on the barrier or the link.

DETAILED DESCRIPTION

The technology relates generally to a barrier system for controlling the movement of objects on a conveyor system. Automated material handling systems include conveyor systems for transporting objects from one station to another station. The barrier system is arranged in the vicinity of the conveyor system and may be selectively deployed to control the movement of an object being transported by the conveyor system, for example, to temporarily stop the movement of the object or to stop the movement of the object in a given direction and/or to divert the object in another direction or onto another conveyor system.

Figure 1A:
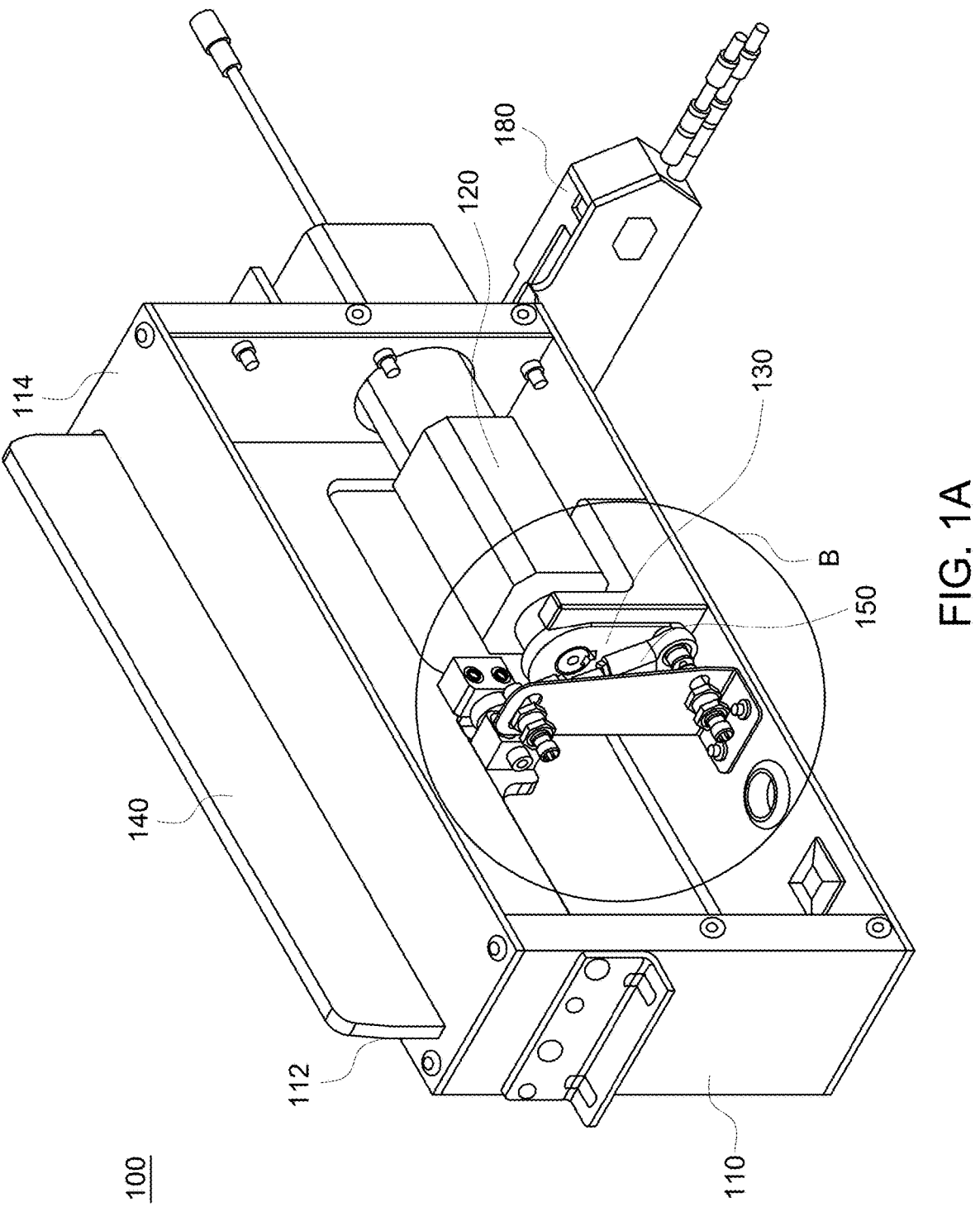
FIG. 1A is a perspective view of a barrier system according to aspects of the disclosure.
Figure 1B:
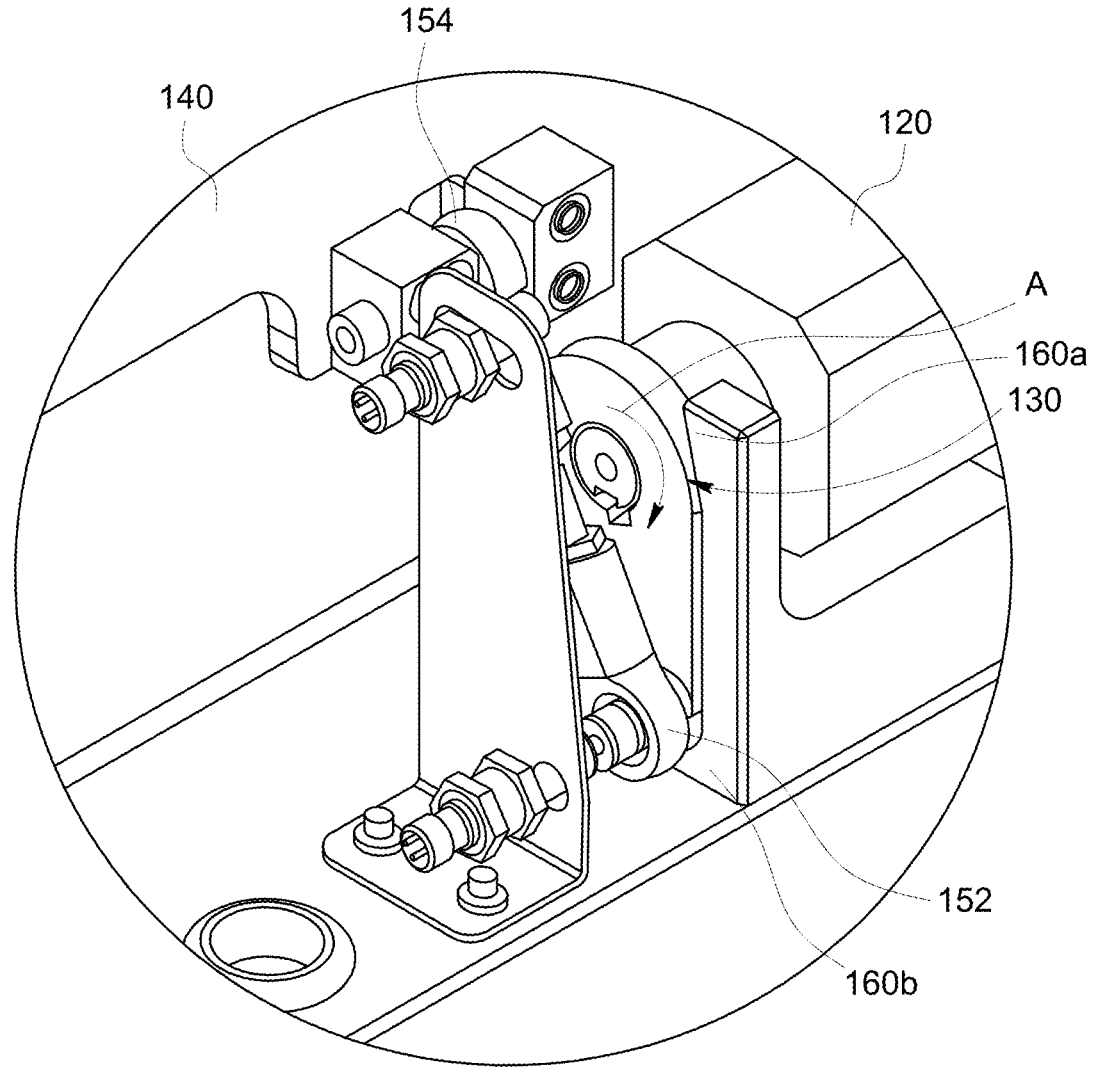
FIG. 1B is a detailed view of a portion of the barrier system of FIG. 1A according to an aspect of the disclosure.
Figure 1C:
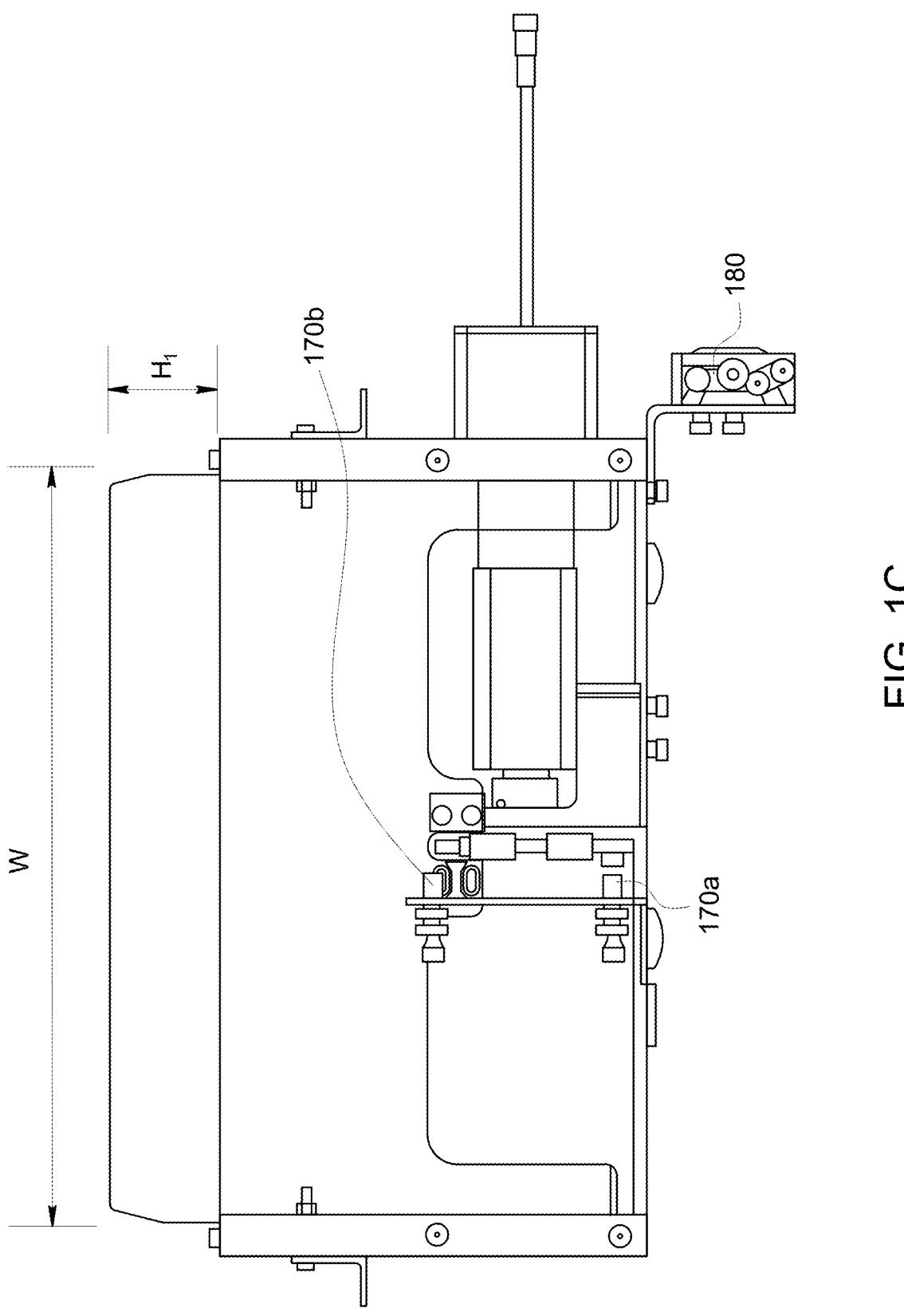
FIG. 1C is a front elevational view of the barrier system of FIG. 1A.
Figure 4A:
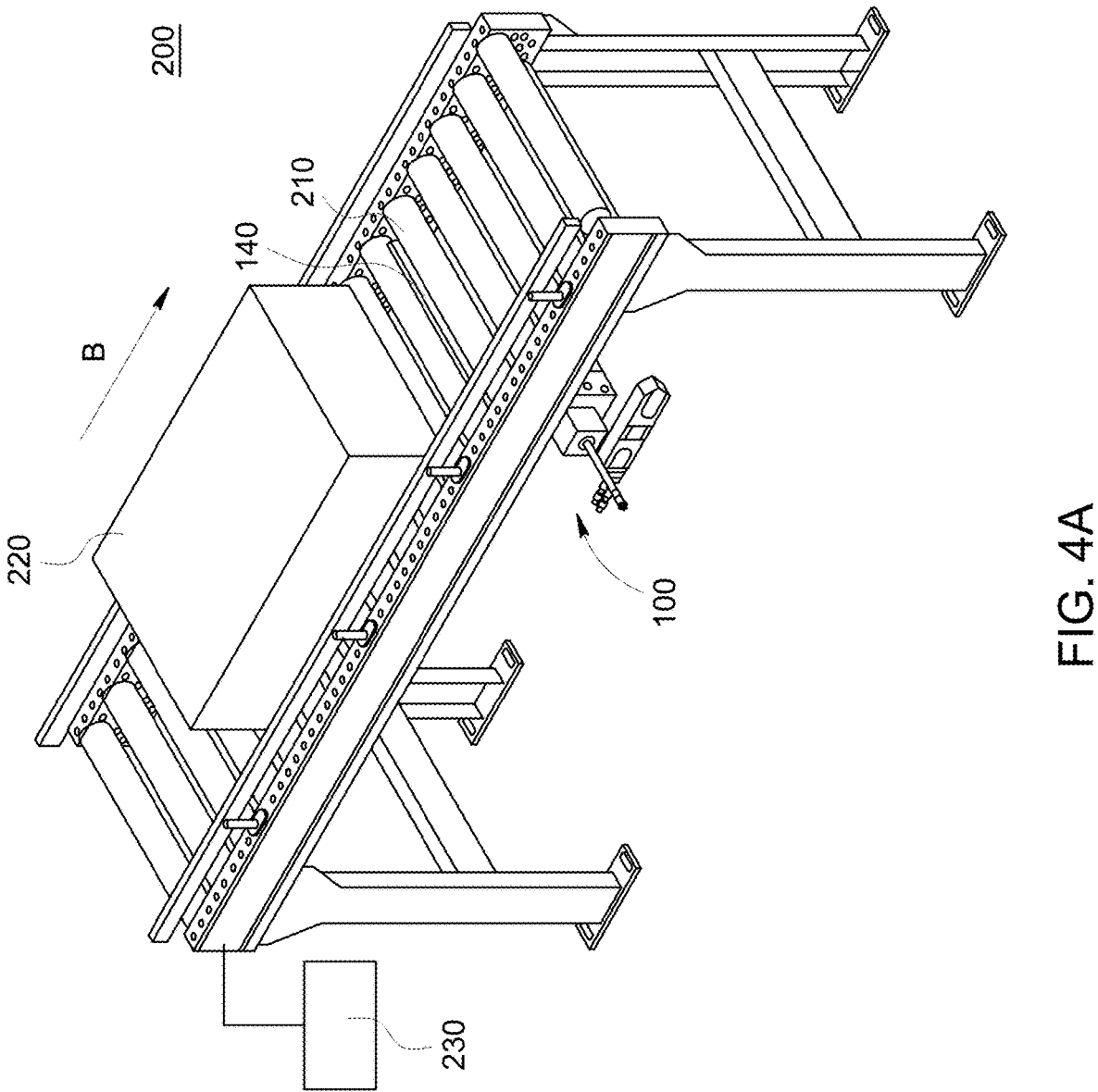
FIG. 4A is a front perspective view of a conveyor system including a barrier system with a barrier in a retracted position.

FIG. 1A illustrates a perspective view of a barrier system 100 for use with a conveyor system, such as conveyor system 200 shown in FIG. 4A, while FIG. 1B illustrates a detailed view of some of the components of the barrier system 100. The barrier system 100 includes a housing 110, an actuator 120, a cam 130 coupled to the actuator 120, and a first controller 180. The first controller 180 may be configured to be integrated with another controller of a conveyor system, such as second controller 230 of conveyor system 200. FIG. 1C is a front elevational view of the barrier system of FIG. 1A As illustrated in FIGS. 1A and 1B, a barrier 140 is pivotably coupled to the cam 130 via a link 150. The barrier system 100 may be a self-contained unit with the actuator 120, the cam 130, and the link 150 accommodated within the housing 110. In an example, the housing 110 defines a compact unit, which can be installed and/or replaced with another such unit, without having to modify the conveyor system to which the barrier system 100 mounted, as further described herein. As such, the barrier system 100 can be installed and/or removed as a single unit. The barrier system 100 may also be replaced with another barrier system, if needed.

Figure 3:
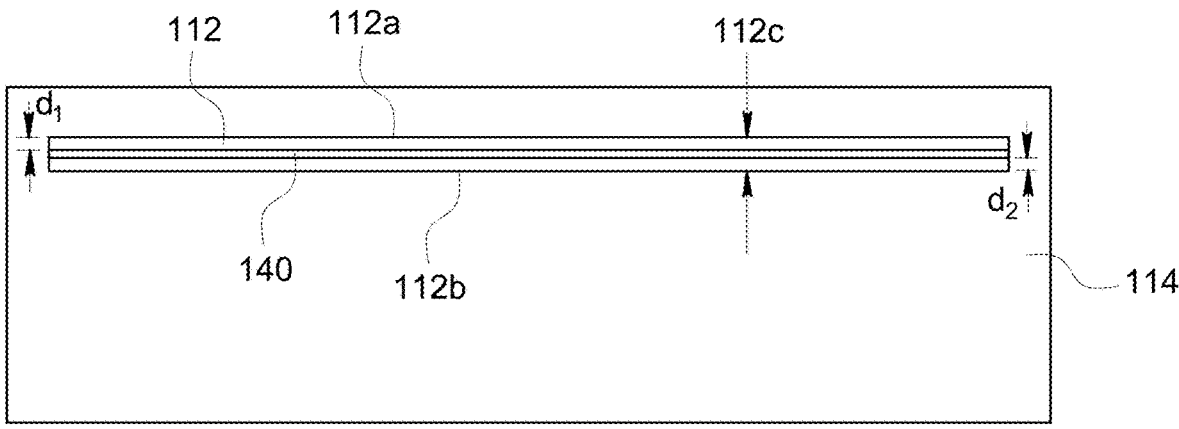
FIG. 3 illustrates a slot defined in an upper surface of a housing of a barrier system.
Figure 6A:
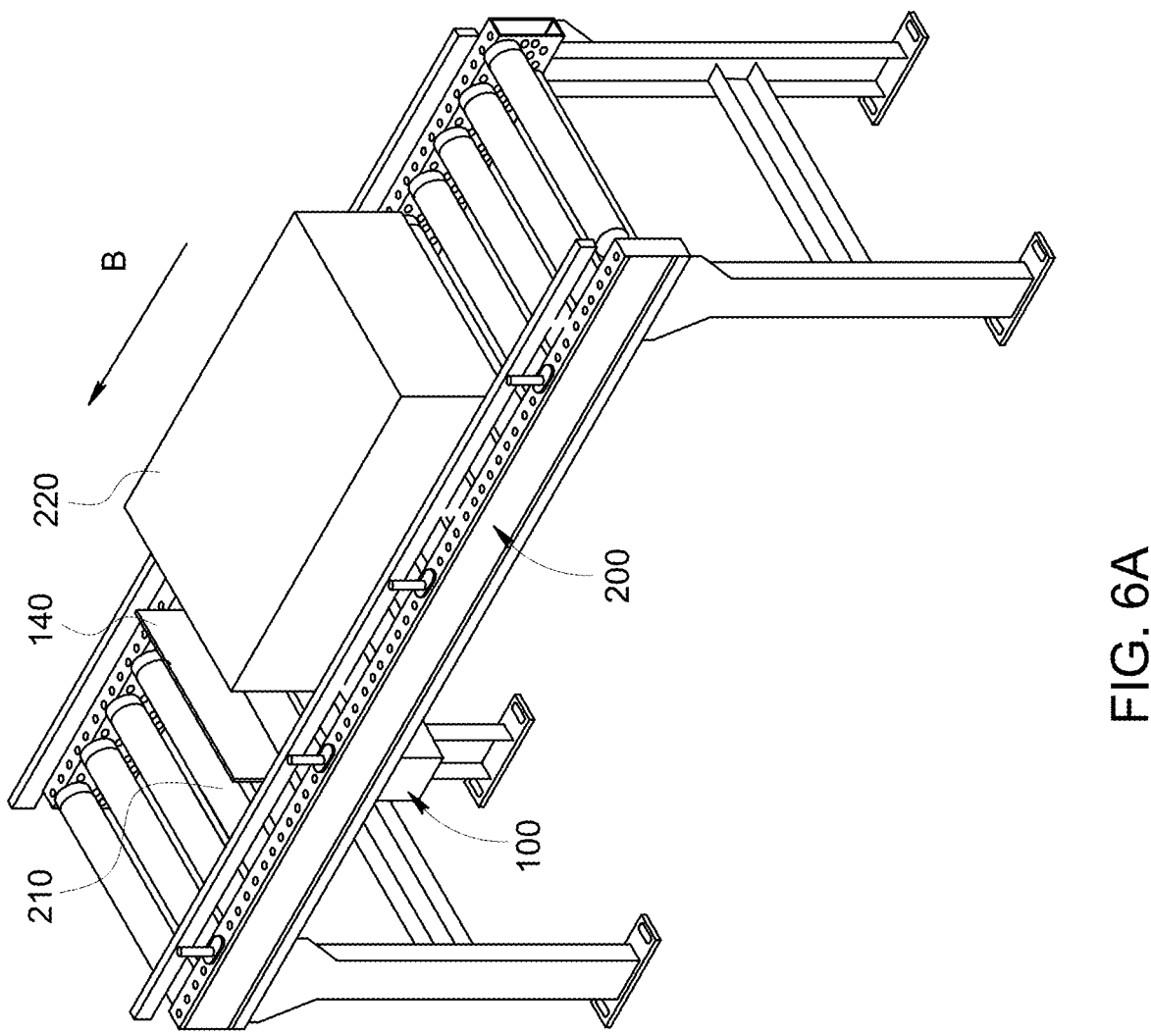
FIG. 6A is a rear perspective view of a conveyor system including a barrier system with the barrier in a deployed position.

Referring also to FIG. 3, a slot 112 is defined in a first surface 114 of the housing 110. The barrier 140 is accommodated at least partially within the housing 110 in a retracted state, i.e., a storage position and may extend beyond the upper surface by a first predetermined height $h_1$. In a deployed state, i.e., in an extended position, the barrier 140 extends out of the slot 112 above the first surface 114, by a second predetermined height $h_2$, as shown in FIG. 6A. For instance, the difference between the second predetermined height $h_2$ and the first predetermined height $h_1$ may be about three (3) inches. In other examples, the difference between the second predetermined height $h_2$ and the first predetermined height $h_1$ may be more than or less than three (3) inches. In some instances, the barrier 140 may have more than one extended position and more than one retracted position. In other examples, the barrier 140 may be accommodated completely within the housing 110 in a fully retracted state. In the illustrated example, the first surface 114 of the housing 110 is a top surface. However, in another example, the first surface 114 of the housing 110 may be a bottom surface of the housing.

The slot 112 is defined by a first edge 112a and a second edge 112b parallel to one another. The first and second edges 112a, 112b are spaced apart from one another by a width or gap 112c. The gap 112c is greater than the thickness t of the barrier 140 such that there is a first distance $d_1$ between the barrier 140 and the first edge 112a and a second distance $d_2$ between the barrier 140 and the second edge 112b when the barrier 140 extends through the slot 112 in its extended position. For instance, the first and second distances $d_1$, $d_2$ can each be about 1 mm. In other examples, the first and second distances $d_1$, $d_2$ can be more than or less than 1 mm. Such narrow distances between the barrier 140 and each of the first and second edges 112a, 112b of the slot 112 serves as a safety measure against an operator accidentally inserting a finger, for example, between the barrier 140 and one of the first and second edges 112a, 112b. The first and second distances $d_1$, $d_2$ may also prevent an operator from inserting any other object into the slot 112 to try to manipulate the barrier 140 or the associated elements in an undesirable manner and/or foreign objects from falling into the interior of the housing 110 and affecting the operation of the barrier system 100.

Figure 1D:
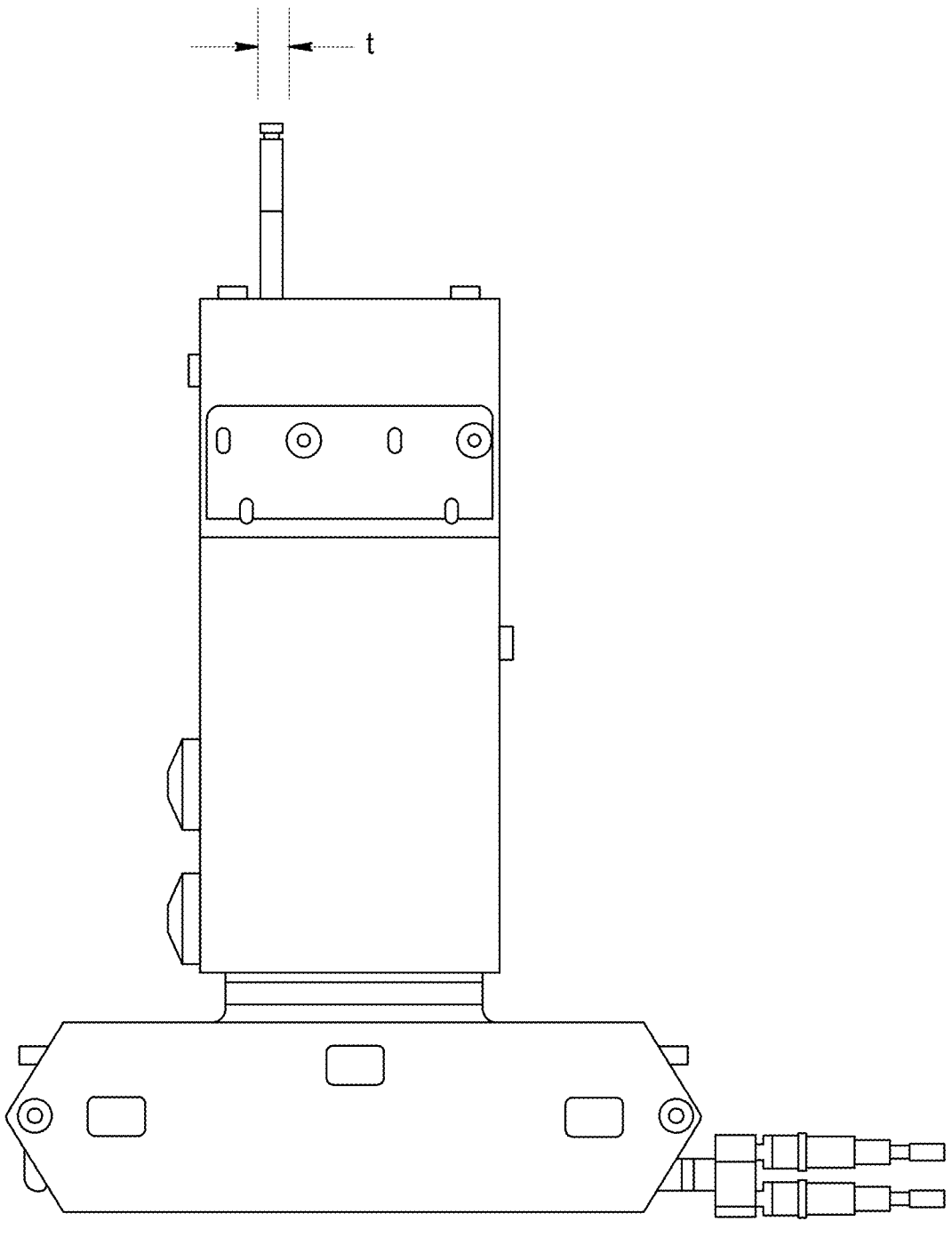
FIG. 1D is a side view of the barrier system of FIG. 1A.
Figure 2A:
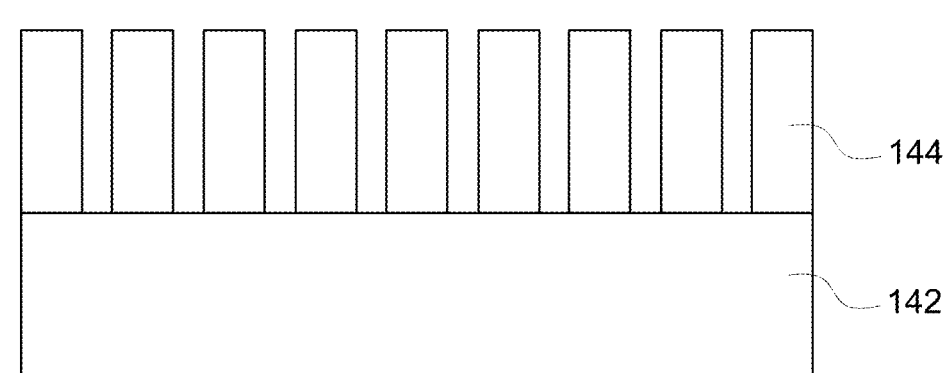
FIGS. 2A AND 2B illustrate respective examples of a barrier according to aspects of the disclosure.
Figure 2B:
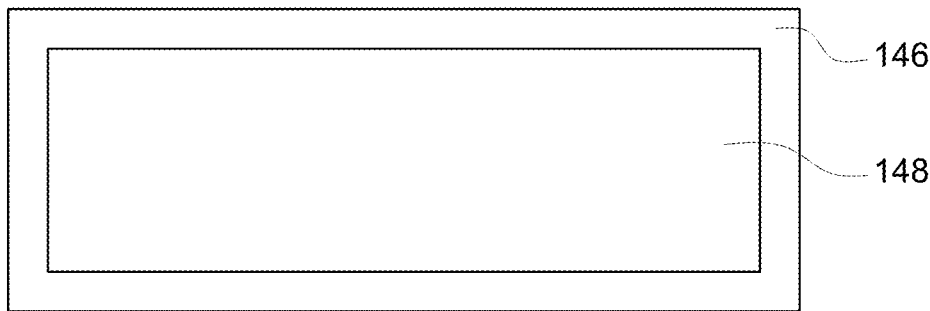

Referring now to FIG. 1D, the barrier 140 may be a generally rectangular plate having a thickness t, a height h, and a width w. Other examples of the barrier 140' may include a base plate 142 with a plurality of fingers 144 extending from the base plate as illustrated in FIG. 2A. The heights of each of the fingers 144 may be the same or different in different examples. In yet another example, the barrier 140" may include a frame 146 having predetermined height, width, and thickness, based on the requirements of an application, as illustrated in FIG. 2B. The frame 146 may define an opening 148 such that an object smaller than the size of the opening may pass through the opening but an object having a size larger than the opening would be obstructed. The barrier 140 may be shaped according to the requirements of a particular application or design. For example, the barrier 140 may be a shape other than rectangular, such as circular, or oval.

Referring back to FIGS. 1A and 1B, the link 150 links the barrier 140 to the actuator 120 via the cam 130. The actuator 120 and the link 150 are configured to move the barrier 140 from the retracted position to the extended position and vice versa. In an example, the actuator 120 is a DC brushless motor system. In other examples, the actuator 120 may be a stepper motor or a servo motor or an AC induction motor.

Figure 6B:
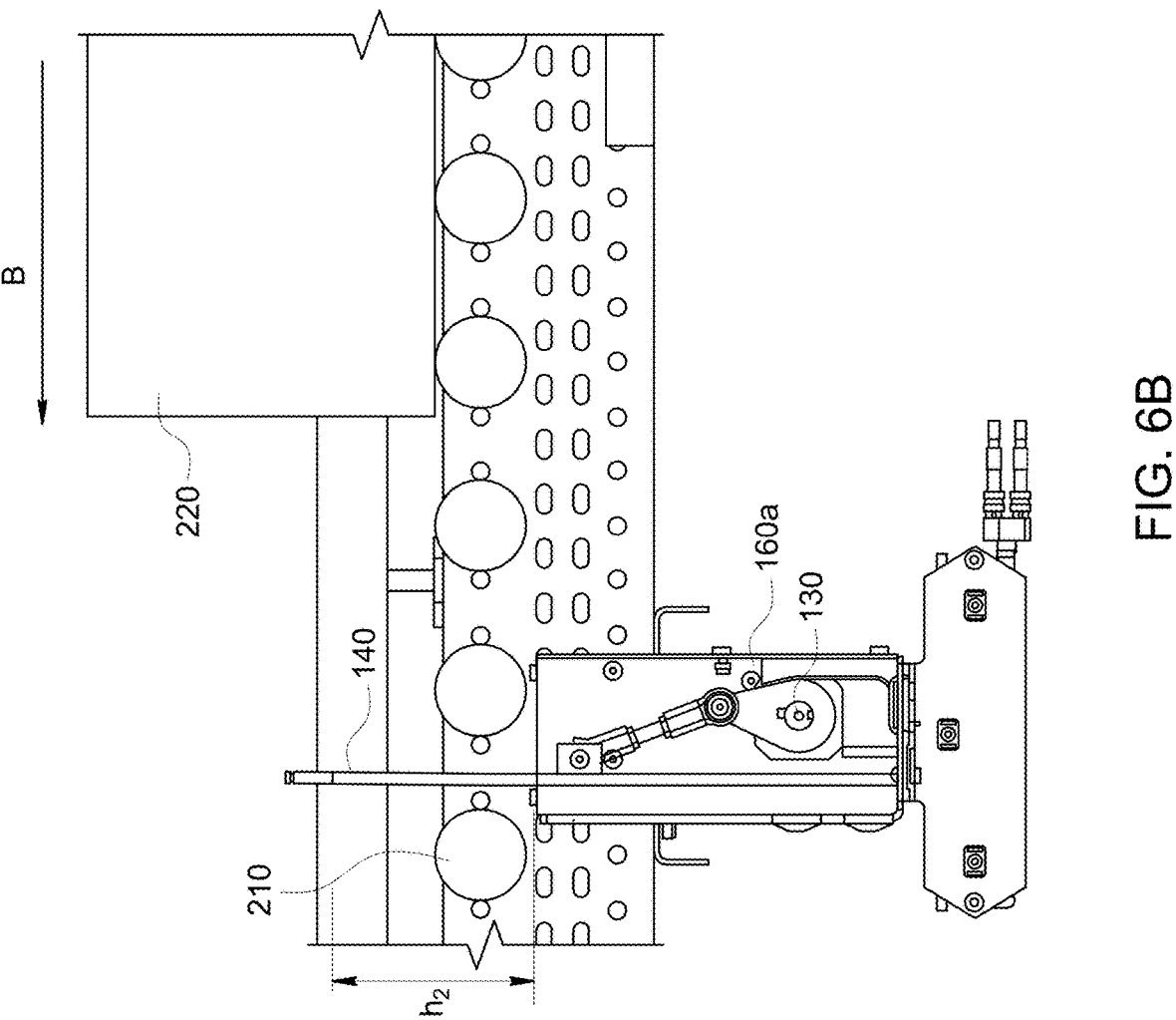
FIG. 6B is a sectional side view of the conveyor system of FIG. 6A.

The cam 130 is movably coupled with the actuator 120. The link 150 has a first end 152 and a second end 154. The first end 152 of the link 150 is rotatably coupled with the cam 130, while the second end 154 of the link 150 is rotatably coupled with the barrier 140. In one example, when the cam 130 and the first end 152 of the link 150 are at their lowermost position, the barrier 140 is in the fully retracted position, as illustrated in FIG. 1A. As the actuator 120 rotates the cam 130 in a clockwise direction shown by arrow A, the cam 130 urges the link 150 and the barrier 140 from the retracted position to an extended position. When the barrier 140 is in the fully extended position, the first end 152 of the link 150 and the cam 130 may be at their uppermost position, as shown in FIG. 6B.

In an example illustrated in FIG. 1B, the barrier system 100 further includes a first stop 160a arranged to inhibit a movement of the cam 130, and thereby that of the link 150 and the barrier 140, in a first direction, i.e., the clockwise direction in the illustrated example, when the barrier 140 is in the extended position. The barrier system also includes a second stop 160b arranged to inhibit a movement of the cam 130, and thereby that of the link 150 and the barrier 140, in a second direction, i.e., an anti-clockwise direction, opposite of the first direction. If an external force is exerted on the barrier 140, for example, when the barrier 140 is in the fully extended position, the first stop 160a will absorb the force, transmitted via the link 150 and the cam 130, and prevent a further movement of the cam 130 in the clockwise direction. Likewise, if an external force is exerted on the barrier 140, for example, when the barrier 140 is in the fully retracted position, the second stop 160b will absorb the force, transmitted via the link 150 and the cam 130, and prevent a further movement of the cam 130 in the anti-clockwise direction. Furthermore, when the barrier 140 is in the extended position, the first end 152 of the link 150 is on a first side of the center towards the first stop 160a. When the barrier 140 is in the retracted position, the first end 150 of the link 150 is again on the first side of the center of the cam 130 towards the second stop 160b.

Referring now to FIG. 1C, the barrier system 100 includes one or more sensors to detect the position of the cam 130. For example, a first sensor 170*a* is arranged to detect the position of the cam 130 when the cam and the first end 152 of the link 150 are at their lowermost position, i.e., when the barrier 140 is in the retracted position. A second sensor 170*b* is arranged to detect the position of the cam 130 when cam 130 and the first end 152 of the link 150 are at their uppermost position, i.e., when the barrier 140 is in the fully extended position. In one implementation, the first sensor 160*a* and the second sensor 160*b* are proximity sensors. In other implementation, the first and second sensors 170*a*, 170*b* may include by way of non-limiting examples only, ultrasonic sensors, laser sensors, retroreflective sensors, and mechanical limit switches. The first and second sensors 170*a*, 170*b* are in electrical communication with the controller 180.

Figure 4B:
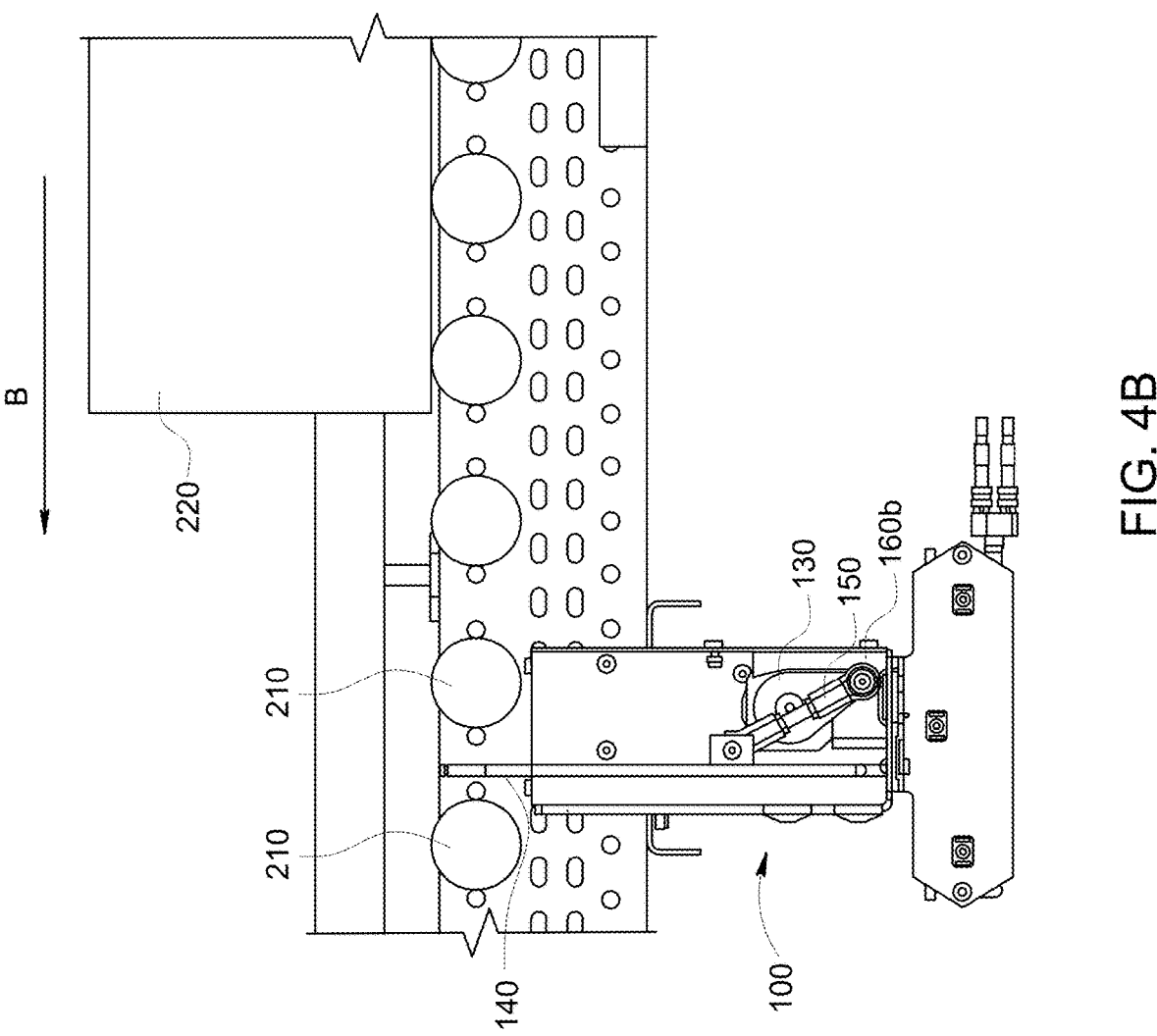
FIG. 4B is a sectional side view of the conveyor system of FIG. 4A.

Referring now to FIGS. 4A-4B, a conveyor system 200 includes at least one roller 210, a second controller 230, and a barrier system 100 removably secured adjacent to the at least one roller 210. In an example, the first controller 180 of the barrier system is compatible with the second controller 230 of the conveyor system 200.

As can be seen, the barrier system 100 occupies a little linear space relative to the length of the conveyor system 200. For example, the barrier system 100 may have a length of about 3 inches to about 4 inches along a length of the conveyor system 200. In other examples, the barrier system 100 may have a length less than or more than the range above. The conveyor system 200 may transport an object 220 from an origin to a destination. While the illustrated conveyor system 200 is a roller conveyor system, in other example, other types of conveyor systems, for example, a belt conveyor system, may also be implemented. When the barrier 140 is in a retracted position, as illustrated in FIGS. 4A-4B, the barrier 140 does not extend beyond the roller 210 and the object 220 may be transported without impedance along the conveyor system in the direction shown by the arrow B. FIG. 4B illustrates a cross-sectional view of the barrier system 100 when the barrier is in the retracted position. The cam 130 is in the lower most position resting against the second stop 160*b*. In the illustrated embodiment, the barrier 140 extends above the first surface 114 of the housing 110, however, does not extend beyond the roller 210 in the retracted state. In other examples, the barrier 140 may not extend beyond the first surface 114 in the retracted state. The width w of the barrier 140 is generally equal to a width of the roller or the conveyor system, i.e., the barrier 140 and the roller 210 are coextensive.

Figure 5:
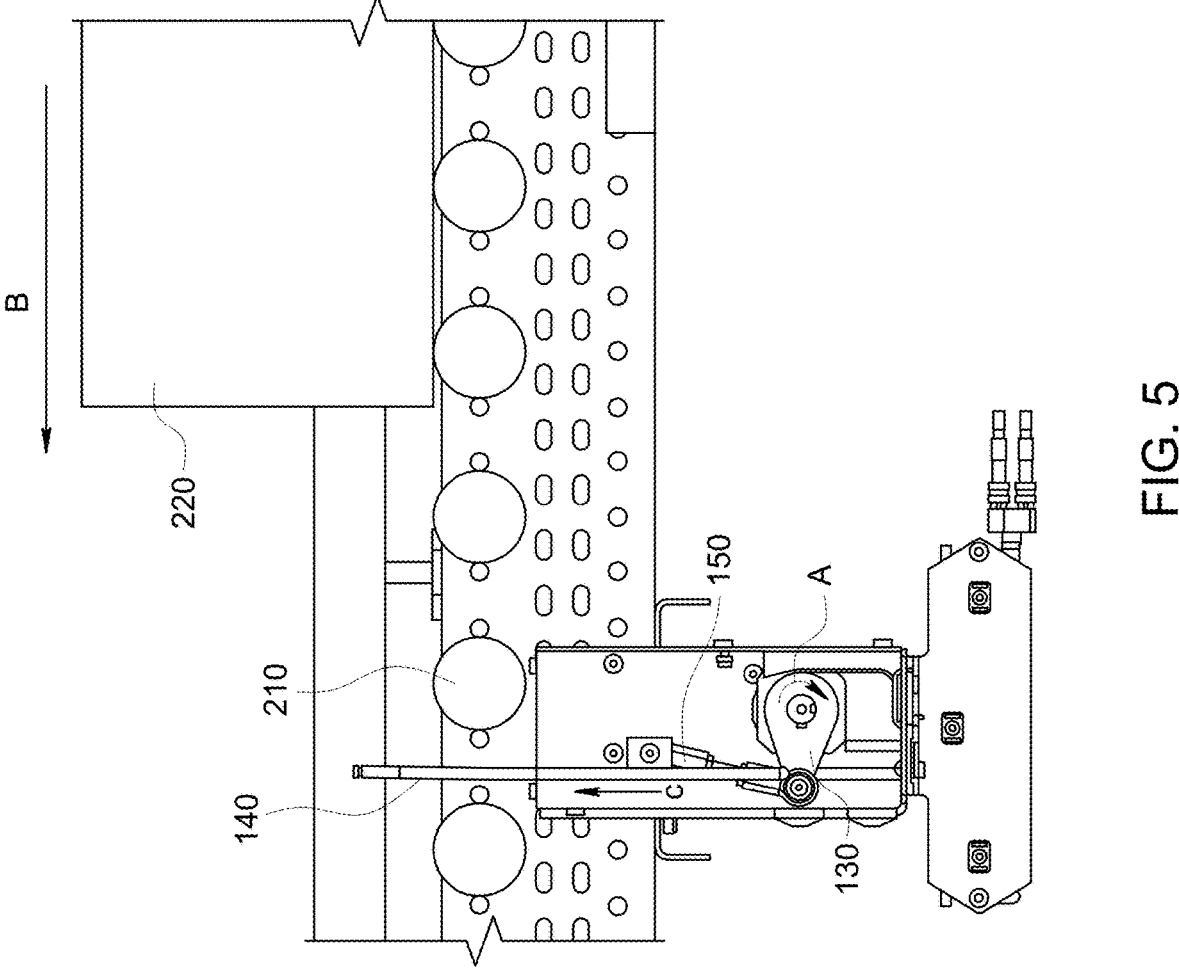
FIG. 5 is a sectional side view of a conveyor system including a barrier system with a barrier in a partially extended position.

FIG. 5 illustrates an initial stage of deployment of the barrier 140. The actuator 120 rotates the cam 130 in the first direction, i.e., the clockwise direction in the illustrated example, thereby urging the barrier 140 upwards via the link 150 in an upward direction shown by the arrow C. In the illustrated stage, the barrier 140 extends a little beyond the roller 210, however the barrier 140 is not yet fully deployed.

Figure 6C:
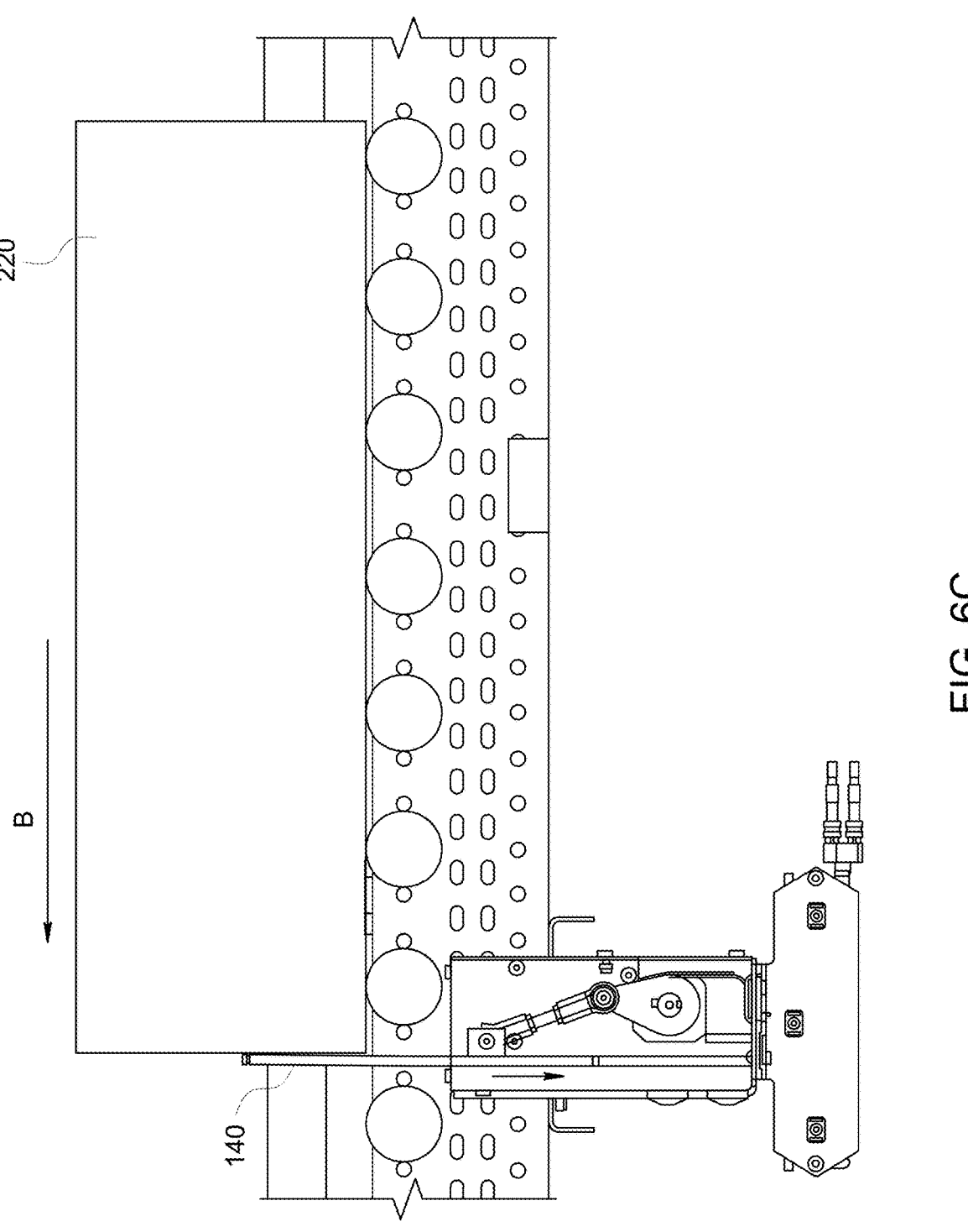
FIG. 6C is a sectional side view of the conveyor system of FIG. 6A with the barrier in an extended position.
Figure 6D:
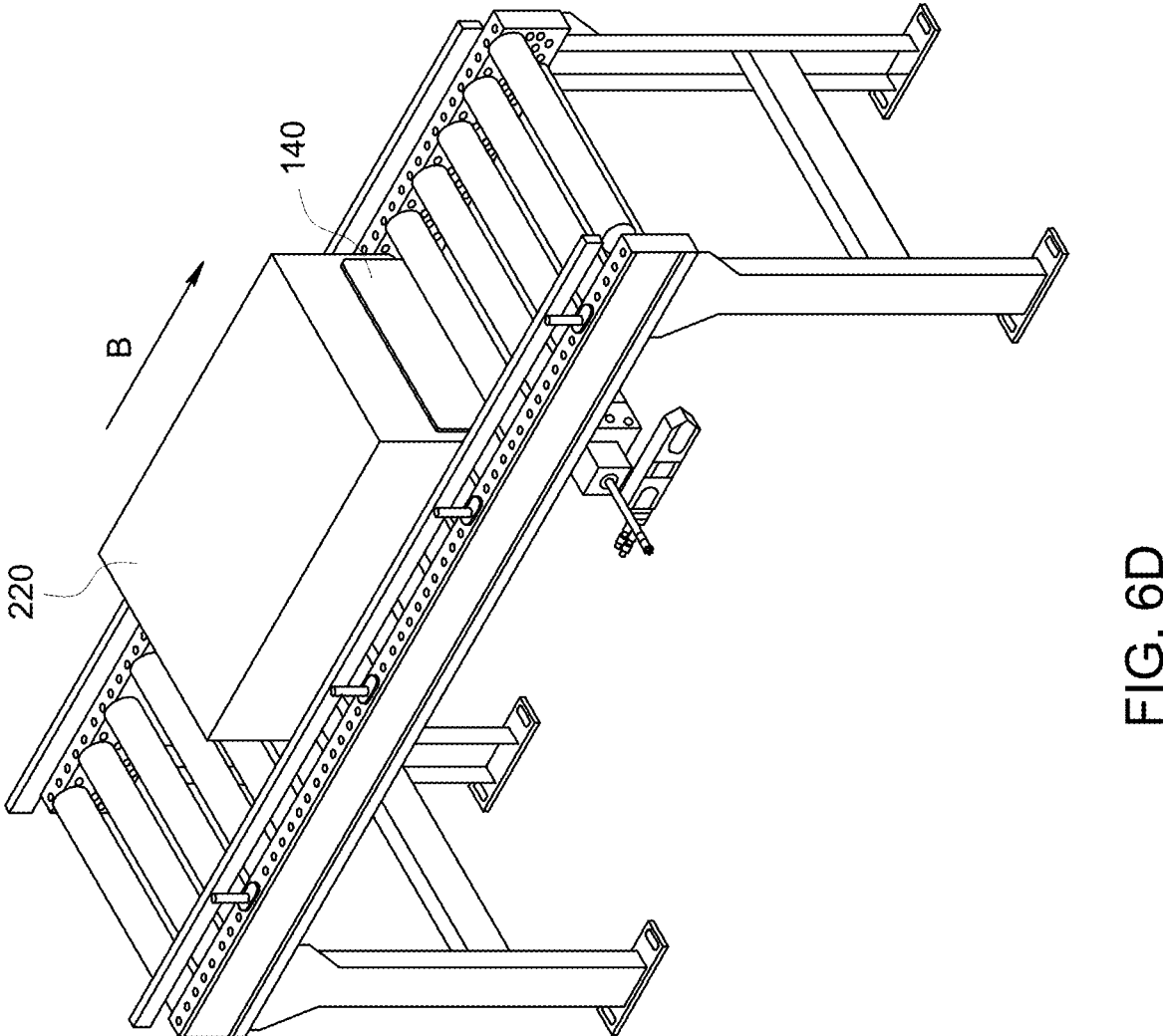
FIG. 6D is a front perspective view of the conveyor system of FIG. 6A.
Figure 6E:
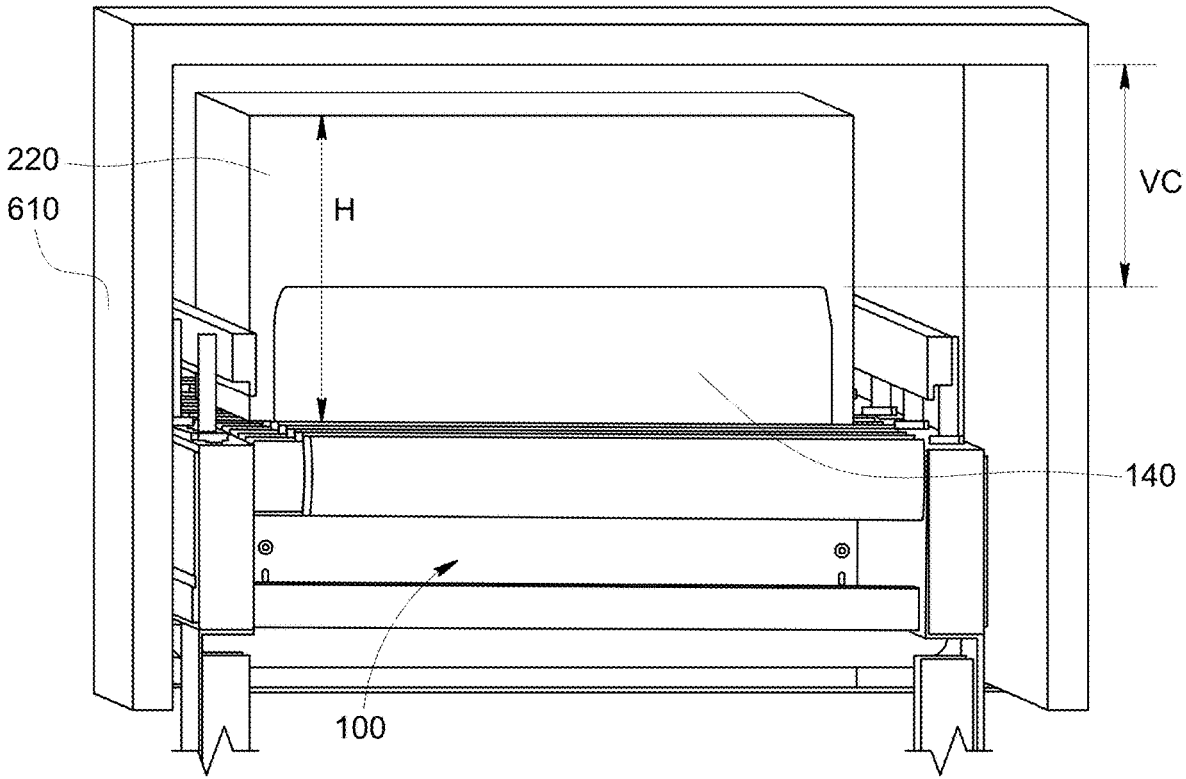
FIG. 6E is a front view of the barrier system of FIG. 6A according to an aspect of the disclosure.

Referring now to FIGS. 6A-6E, the barrier 140 is in the fully deployed state, extending above the roller 210, while the object 220 is travelling in the direction shown by the arrow B along the conveyor system 200. FIGS. 6A and 6B illustrate the barrier 140 in a fully deployed state, while the object 220 is travelling toward the barrier 140 in the direction shown by the arrow B. FIGS. 6C-6E, on the other hand, illustrate different views of the object 200 blocked by the fully deployed barrier 140, i.e., a elevational view in FIG. 6C, a front perspective view in FIG. 6D, and a front view of an example in FIG. 6E. As can be seen in FIGS. 6B and 6C, the cam 130 is in its uppermost position urging against the first stop 160*a*. Any further movement of the cam 130 in the clockwise direction will be resisted by the first stop 160*a*. In the illustrated example, the barrier 140 extends about three (3) inches above the roller 210. In other examples, the barrier 140 may extend by a different height depending on the dimensions of the object 220 as well as other requirements of the application. In this state, the first end 152 of the link 150 off-center to the center of the cam 130 in the clockwise direction. If an operator were to push the barrier 140 downward, the link 150 would urge the cam 130 in the clockwise direction, which movement would be resisted by the first stop 160*a*. Thus, the described configuration of the cam 130 and the first stop 160*a* is resistant to an attempt to bypass the barrier system 100. Such a configuration will prevent or reduce misuse or undesirable manipulation of the barrier system as well as will reduce mechanical deviation over time, leading to a more robust system.

As the object 220 reaches the barrier 140, further movement of the object 220 is blocked by the fully deployed barrier 140 in the direction shown by the arrow B. The object 220 will not move further until the barrier 220 is retracted.

FIG. 6E illustrates the conveyor system 100 extending through a tunnel 610 in an example. The tunnel 610 can demarcate a secured zone. The barrier system 100 can be deployed to restrict a vertical clearance VC to less than, for example, a height H of the object 220. When the barrier 140 is deployed, the vertical clearance is so reduced as to restrict any manipulation of the object 220 into or out of the tunnel 610. Thus, when the barrier 140 is deployed, an operator cannot insert or remove an object 220 through the tunnel 610, i.e., into or out of the secured zone.

Figure 7A:
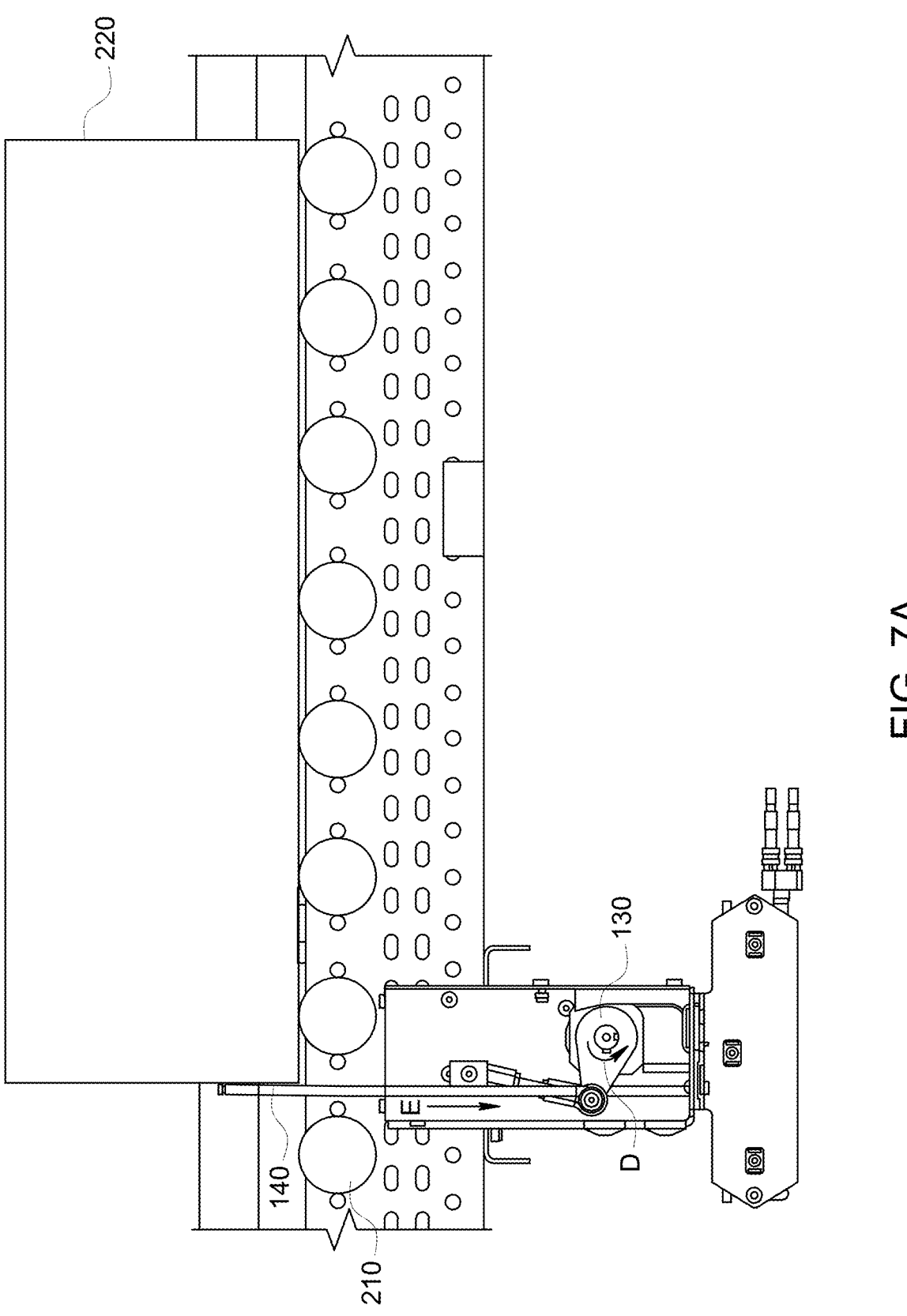
FIG. 7A is a sectional side view of a barrier system with a barrier in a partially retracted position.
Figure 7B:
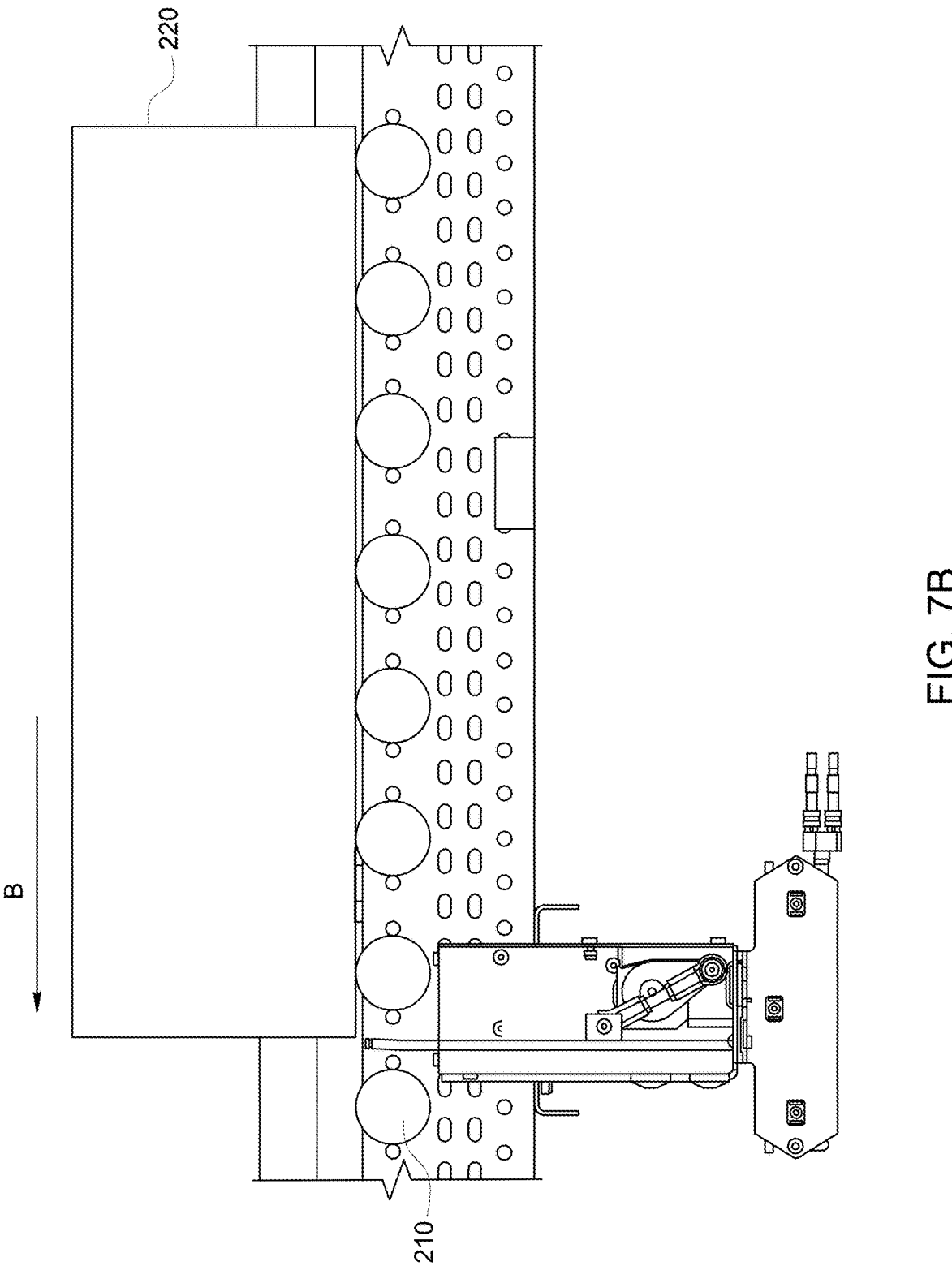
FIG. 7B is a sectional side view of the barrier system of FIG. 7A with the barrier in a fully retracted position.
Figure 7C:
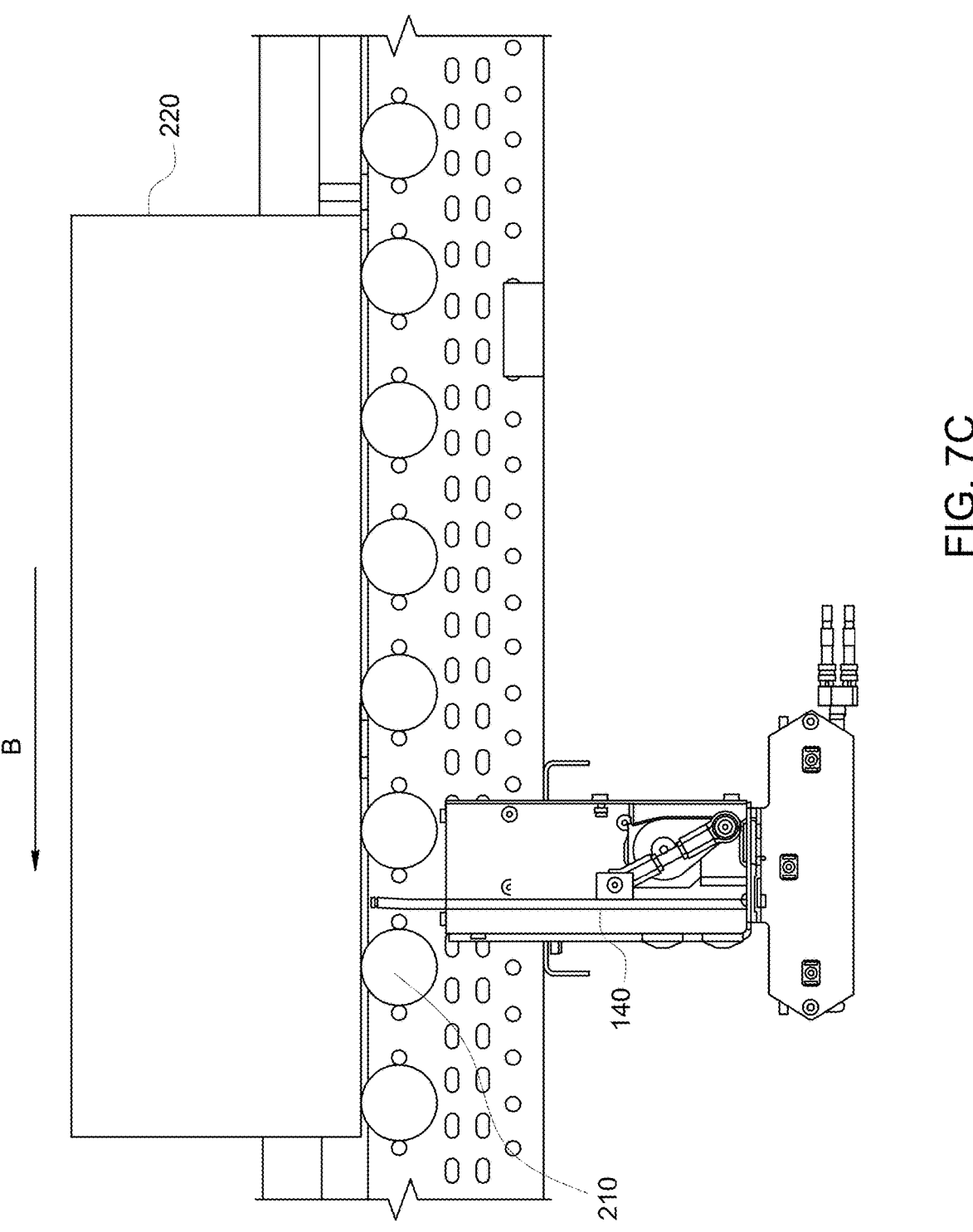
FIG. 7C is a sectional side view of the barrier system of FIG. 7A with an object passing over the retracted barrier.

Referring now to FIGS. 7A-7C, the barrier 140 is shown in the process of being retracted. The actuator 120 rotates the cam 130 a counterclockwise in the direction shown by the arrow D, as shown in FIG. 7A. The cam 130, in turn, pulls the first end 152 of the link 150 downward, thereby lowering the barrier 140 in a downward direction, shown by the arrow E. As the barrier 140 assumes its retracted position, the barrier 140 no longer obstructs the movement of the object 220 in the direction shown by the arrow B, as shown in FIG. 7B. The object 220 is then transported by the conveyor system 200 passing over the retracted barrier 140, as shown in FIG. 7C.

Figure 8:
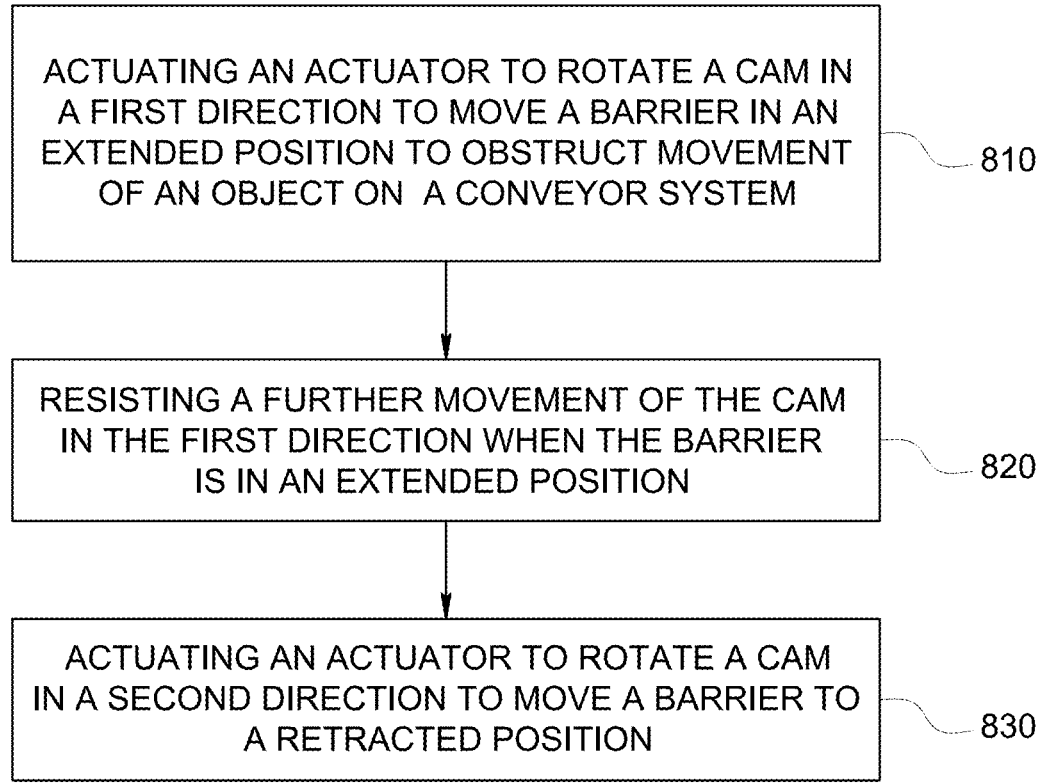
FIG. 8 illustrates a flow chart for a method for controlling a movement of an object on a conveyor system using a barrier system described herein.

Referring now to FIG. 8, a flow chart for a method 800 for controlling the movement of object 220 on the conveyor system 200 is illustrated. At step 810, the method includes actuating the actuator 120 to rotate the cam 130 in a first direction, wherein the cam 130 is connected to the barrier 140 via the link 150. The link 150 moves the barrier 140 to an extended position to extend beyond the roller element 210 of the conveyor system 200, thereby obstructing a movement of the object 220 conveyed by the conveyor system 200. At step 820, the method includes actuating the actuator 120 to rotate the cam 130 in a second direction opposite of the first direction. The link 150 moves the barrier 140 to a retracted position, thereby permitting a movement of the object 220 beyond the roller element 210. At step 830, the method further includes resisting a further movement of the cam 130 in the first direction, when the barrier 140 is in the extended position and an external force is applied on the barrier 140 or the link 150.

An advantage of the barrier system described above is that the system is a robust system and can sustain a large number of cycles without degradation or damage. Another advantage of the barrier system is that, in case repairs are needed, the barrier system 100 can be easily removed from the conveyor system 200 and replaced with another barrier system 100. Yet another advantage is that the barrier system 100 occupies insignificant linear space along the conveyor system 200. Yet another advantage of the barrier system 100 is that the system is a compact modular system, which requires less space than a normal blade stop system, while extending to a greater distance beyond the roller.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A barrier system comprising:
an actuator;
a cam movably coupled to the actuator;
a barrier;
a linkage system connecting the barrier to the actuator and configured to move the barrier element between a retracted position and an extended position, the linkage system comprising a link having a first end and a second end; and
a stop arranged to inhibit a motion of the linkage system in a first direction when the barrier is in the extended position,
wherein the first end of the link is rotatably coupled to the cam, and
wherein the second end of the link is rotatably coupled to the barrier.

2. The barrier system according to claim 1, wherein the stop is configured to inhibit a motion of the linkage system in a second direction when the barrier is in the retracted position.

3. The barrier system according to claim 1, wherein the actuator comprises a brushless DC motor.

4. The barrier system according to claim 1, wherein the barrier has a first height configured to extend a first predetermined distance above the top surface when the barrier is in the extended position.

5. The barrier system according to claim 1, further comprising a housing accommodating the actuator, the linkage system, the stop and the barrier in the retracted position.

6. The barrier system according to claim 5, wherein the housing comprises a first surface having a slot defined therewithin.

7. The barrier system according to claim 6, wherein the slot is defined by first and second edges parallel to one another and spaced apart by a width.

8. The barrier system according to claim 7, wherein the barrier has a first thickness and the width of the slot is greater than the first thickness such that there is a first predetermined distance between the barrier and the first edge and a second predetermined distance between the barrier and the second edge when the barrier extends through the slot.

9. A barrier system comprising:
an actuator;
a cam movably coupled to the actuator;
a barrier;
a linkage system connecting the barrier to the actuator and configured to move the barrier element between a retracted position and an extended position; a sensor configured to detect a position of the cam, and
a stop arranged to inhibit a motion of the linkage system in a first direction when the barrier is in the extended position.

10. The barrier system according to claim 9, wherein the sensor comprises a first sensor configured to detect a position of the cam when the barrier is in the retracted position.

11. The barrier system according to claim 10, wherein the sensor comprises a second sensor configured to detect a position of the cam when the barrier is in the extended position.

12. A method for controlling a movement of an object on a conveyor system, the method comprising:
actuating an actuator to rotate a cam in a first direction, the cam connected to a barrier via a link, and
detecting a position of the cam with a sensor,
wherein the link moves the barrier to an extended position to extend beyond a roller element of the conveyor system, thereby obstructing a movement of the object conveyed by the conveyor system.

13. The method according to claim 12, further comprising:
actuating the actuator to rotate the cam in a second direction opposite of the first direction, wherein the link moves the barrier to a retracted position, thereby permitting a movement of the object beyond the roller element.

14. The method according to claim 13, further comprising resisting a further movement of the cam in the first direction, when the barrier is in the extended position and an external force is applied on the barrier or the link.

15. A system comprising:
a conveyor system having at least one roller element; and
a barrier system removably secured adjacent to the at least one roller element, the barrier system comprising:
an actuator;
a cam movably coupled to the actuator;
a sensor configured to detect a position of the cam,
a barrier; and
a linkage system connecting the barrier to the actuator and configured to move the barrier between a retracted position and an extended position,
wherein the barrier is configured to extend beyond the at least one roller element by a second predetermined distance when in the extended position.

16. The system according to claim 15, further comprising a stop arranged to inhibit a motion of the linkage system in a first direction when the barrier is in the extended position.

17. The system according to claim 15, further comprising a first controller configured to control the actuator; and/or wherein the first controller is compatible with a second controller of the conveyor system.

* * * * *